US012571252B2

(12) United States Patent
Freirich et al.

(10) Patent No.: US 12,571,252 B2
(45) Date of Patent: Mar. 10, 2026

(54) VALANCE ASSEMBLY AND RELATED COVERINGS FOR AN ARCHITECTURAL STRUCTURE

(71) Applicant: Hunter Douglas Inc., New York, NY (US)

(72) Inventors: Gordon Freirich, Tempe, AZ (US); Claude Mathew McNiel, Gilbert, AZ (US); Zoe Ann Jirovsky, Chandler, AZ (US)

(73) Assignee: Hunter Douglas Inc., New York, NY (US)

( * ) Notice: Subject to any disclaimer, the term of this patent is extended or adjusted under 35 U.S.C. 154(b) by 261 days.

(21) Appl. No.: 18/119,337

(22) Filed: Mar. 9, 2023

(65) Prior Publication Data

US 2023/0287736 A1 Sep. 14, 2023

Related U.S. Application Data

(60) Provisional application No. 63/318,936, filed on Mar. 11, 2022.

(51) Int. Cl.
*E06B 9/323* (2006.01)

(52) U.S. Cl.
CPC .................................... *E06B 9/323* (2013.01)

(58) Field of Classification Search
CPC .................................. A47H 2/00; E06B 9/323
See application file for complete search history.

(56) References Cited

U.S. PATENT DOCUMENTS 596,929 A * 1/1898 Name not available .................... A47H 2/00 160/38
2,027,280 A * 1/1936 Lindemann ............. E06B 9/323 160/902
2,138,502 A 11/1938 Nordstrom, Jr. et al.
2,175,761 A * 10/1939 Quinlan ................... A47H 2/00 160/19
2,203,372 A * 6/1940 Trammell ............... E06B 9/323 160/902
2,296,625 A * 9/1942 Bird ......................... E06B 9/323 160/34
2,423,978 A * 7/1947 Hunter .................... E06B 9/323 160/902
2,508,737 A * 5/1950 Zeto ........................ E06B 9/323 248/263
2,526,393 A * 10/1950 Nelson .................... E06B 9/323 160/902

(Continued)

FOREIGN PATENT DOCUMENTS

EP 2213829 A2 8/2010
GB 2413937 A 11/2005

(Continued)

*Primary Examiner* — Johnnie A. Shablack
(74) *Attorney, Agent, or Firm* — Dority & Manning, P.A.

(57) ABSTRACT

In one aspect, a valance assembly includes first and second valance mounts and a valance body extending in a lateral direction between the first and second valance mounts, with the valance body being configured to at least partially conceal a headrail of an associated covering. Each valance mount is generally configured to form mounting structure for supporting both the valance body and the headrail relative to an adjacent architectural structure.

20 Claims, 6 Drawing Sheets

(56) References Cited

U.S. PATENT DOCUMENTS

| | | | | | |
|---|---|---|---|---|---|
| 2,549,905 | A * | 4/1951 | Jablon | E06B 9/323 160/902 |
| 2,670,167 | A * | 2/1954 | Nelson | E06B 9/323 292/300 |
| 2,689,704 | A * | 9/1954 | Rosenbaum | E06B 9/323 248/262 |
| 2,752,117 | A | 6/1956 | Hummert et al. | |
| 4,254,814 | A * | 3/1981 | Vecchiarelli | E06B 9/323 160/19 |
| 4,662,421 | A * | 5/1987 | Basmadji | E06B 9/38 160/39 |
| 4,782,554 | A | 11/1988 | Lawson | |
| 4,828,002 | A * | 5/1989 | Ashby | E06B 9/323 403/381 |
| 4,921,031 | A * | 5/1990 | Wagner | A47H 2/00 160/902 |
| 5,039,049 | A | 8/1991 | Niemi | |
| 5,042,548 | A * | 8/1991 | Attal | A47H 2/00 160/21 |
| 5,520,234 | A | 5/1996 | Simmons | |
| 5,647,421 | A | 7/1997 | Hoffmann et al. | |
| 5,944,084 | A * | 8/1999 | Cadorette | A47H 2/00 160/19 |
| 6,659,154 | B2 * | 12/2003 | Bergeron | E06B 9/36 160/38 |
| 6,666,251 | B2 * | 12/2003 | Ikle | E06B 9/40 160/31 |
| 6,672,359 | B2 * | 1/2004 | Morris | A47H 2/00 160/19 |
| 6,817,402 | B1 | 11/2004 | Fraczek et al. | |
| 7,216,686 | B2 | 5/2007 | Repp et al. | |
| 8,807,190 | B2 | 8/2014 | Wills et al. | |
| 9,488,000 | B2 | 11/2016 | Kirby et al. | |
| 10,017,984 | B2 | 7/2018 | Marzilli et al. | |
| 10,544,621 | B2 | 1/2020 | Mocanu et al. | |
| 10,694,880 | B2 | 6/2020 | Mullet et al. | |
| 10,968,693 | B2 * | 4/2021 | Stout | E06B 9/323 |
| 12,044,066 | B2 * | 7/2024 | Kirby | E06B 9/68 |
| 2003/0010174 | A1 * | 1/2003 | Biro | A47H 2/00 83/581 |
| 2006/0118247 | A1 * | 6/2006 | Olsen | E06B 9/323 160/38 |
| 2018/0106102 | A1 | 4/2018 | Holt et al. | |
| 2018/0155983 | A1 | 6/2018 | Franssen | |
| 2018/0163464 | A1 | 6/2018 | Mcneill et al. | |
| 2018/0328107 | A1 | 11/2018 | Stout et al. | |
| 2019/0162024 | A1 | 5/2019 | Ng | |
| 2019/0271190 | A1 * | 9/2019 | Chou | E06B 9/266 |
| 2022/0235607 | A1 * | 7/2022 | Zhu | E06B 9/38 |
| 2022/0298854 | A1 * | 9/2022 | Fitzgerald | E06B 9/323 |
| 2024/0110439 | A1 * | 4/2024 | Colson | E06B 9/32 |
| 2024/0410225 | A1 * | 12/2024 | Butler | E06B 9/17023 |

FOREIGN PATENT DOCUMENTS

| | | | |
|---|---|---|---|
| GB | 2501593 | B | 7/2016 |
| WO | WO 2020/053450 | A1 | 3/2020 |
| WO | WO 2020/058066 | A1 | 3/2020 |

* cited by examiner

VALANCE ASSEMBLY AND RELATED COVERINGS FOR AN ARCHITECTURAL STRUCTURE

CROSS-REFERENCE TO RELATED APPLICATIONS

The present application is based upon and claims the right of priority to U.S. Provisional Patent Application No. 63/318,936, filed Mar. 11, 2022, the disclosure of which is hereby incorporated by reference herein in its entirety for all purposes.

FIELD

The present subject matter relates generally to coverings for architectural structures and, more particularly, to valance assemblies configured for use with coverings for architectural structures.

BACKGROUND

In many instances, a fascia or valance is coupled to the front of a headrail of a window covering to improve the overall aesthetic appearance of the window covering. For example, valances often have a unique shape or outer profile that provides a more aesthetically pleasing look than the front of the headrail, itself. In addition to headrails, valances may also be used to obscure adjacent support or mounting structure for the covering, such as mounting brackets. As is generally understood, a main valance body may be secured to and supported by an associated headrail using a variety of different techniques, such as by using valance clips coupled between the headrail and the valance body. In addition to the main valance body that extends along the front side of the headrail, separate valance returns are typically provided that extend from the opposed ends of the valance body to cover the lateral ends of the headrail and the associated brackets that support the lateral ends of the headrail.

With conventional valance assemblies, the valance returns must be separately supported relative to the adjacent architectural structure independent of the brackets supporting the headrail. For instance, the headrail brackets are typically mounted relative to the adjacent architectural structure first, with the headrail and associated covering then being installed relative to the brackets. Once the covering has been installed relative to the brackets, the valance and associated valance returns are then installed relative to the headrail and the adjacent architectural structure to complete the installation. With such a configuration and related installation methodology, for inside-mounted coverings, a lateral gap is typically present between each valance return and the adjacent sidewalls of the window frame due to the need for allowing sufficient clearance to fit the returns within the window. Additionally, conventional valance assemblies must be configured to accommodate not only dimensional variations associated with the adjacent architectural structure (e.g., variations in the lateral width and/or depth of the window frame), but also variations in the lateral and/or depthwise dimensions associated with mounting the opposed headrail brackets relative to one another. For instance, depending on the depth at which a headrail is mounted within a window frame, the valance returns may need to be shorter or longer in the depthwise direction. As such, valance assemblies often present numerous manufacturing and installation challenges. Moreover, with variations in the design or type of covering relative to which the valance assembly is being installed, it often quite difficult to provide standardized valance assemblies that can be used across multiple different coverings while still maintaining the desired aesthetic appearance.

Accordingly, an improved valance assembly configuration that address one or more of the issues associated with conventional valance assemblies would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a valance assembly for at least partially concealing a headrail of a covering for an architectural structure. The valance assembly includes a valance body extending in a lateral direction between a first lateral end and an opposed second lateral end. The valance assembly also includes first and second valance mounts configured to support first and second lateral ends, respectively, of a headrail of a covering. The first and second valance mounts are also configured to support the first and second lateral ends, respectively, of the valance body relative to the headrail. Each valance mount includes an endcap comprising an end wall and a front wall extending outwardly from the end wall. The endcap defines a valance retention channel relative to the front wall of the endcap that is configured to receive a respective one of the first and second lateral ends of the valance body. Each valance mount further includes a plurality of bracket walls extending outwardly relative to the end wall of the endcap in the lateral direction. A first bracket wall of the plurality of bracket walls forms a shelf on which a respective one of the first and second lateral ends of the headrail is configured to rest to allow the respective valance mount to support the respective one of the first and second lateral ends of the headrail.

In another aspect, the present subject matter is directed to a valance assembly for at least partially concealing a headrail of a covering for an architectural structure. The valance assembly includes a valance body extending in a lateral direction between a first lateral end and an opposed second lateral end, and first and second endcaps configured to support the first and second lateral ends, respectively, of the valance body. Each end cap includes an end wall and a front wall extending outwardly from the end wall. A valance retention channel is defined relative to the front wall of each of the first and second endcaps that is configured to receive a respective one of the first and second lateral ends of the valance body. Moreover, the valance body is configured the same as one or more of a plurality of slats of the covering relative to which the valance assembly is configured to be installed.

In a further aspect, the present subject matter is directed to a covering for an architectural structure. The covering includes a headrail, a bottom rail supported relative to the headrail, a plurality of slats supported between the headrail and the bottom rail, and a valance assembly configured to at least partially conceal the headrail. The valance assembly includes a valance body extending adjacent to the headrail in a lateral direction between a first lateral end and an opposed second lateral end, and first and second endcaps configured to support the first and second lateral ends, respectively, of the valance body relative to the headrail. The valance body is configured the same as the plurality of slats such that the valance body is interchangeable with the plurality of slats.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
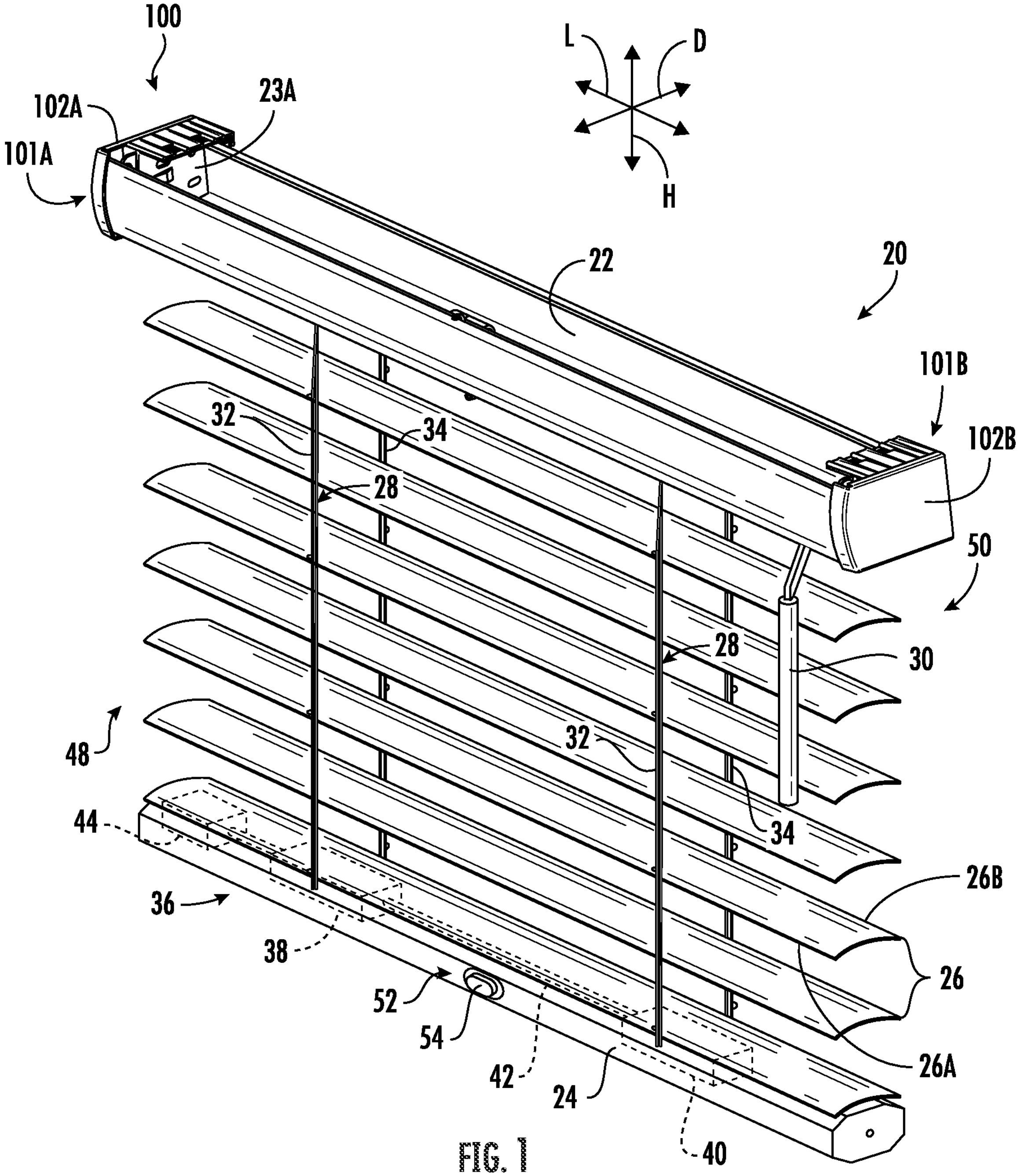
FIG. 1 illustrates a perspective view of one embodiment of a covering for an architectural structure in accordance with aspects of the present subject matter.

In general, the present subject matter is directed to a valance assembly configured for use with a covering for an architectural feature or structure (referred to herein simply as an architectural "structure" for the sake of convenience and without intent to limit). The valance assembly includes a pair of opposed valance mounts and a valance body configured to extend between the valance mounts so as to allow the valance body to at least partially cover or conceal the front side of a headrail of the associated covering.

In several embodiments, each valance mount includes an endcap and an associated end bracket. The endcap and end bracket are generally configured to be coupled together such that the components collectively define mounting structure for supporting both the valance body of the valance assembly and the headrail of the associated covering relative to an adjacent architectural structure. For instance, in one embodiment, each endcap may define a valance retention channel for receiving and supporting a respective lateral end of the valance body. As such, by installing the valance body between the endcaps (e.g., with each end of the valance body being received within a respective retention channel of the adjacent endcap), the valance body may be supported along its length at a location adjacent to the headrail. Additionally, by coupling the endcap to the end bracket, the assembled components can be mounted together as the valance mount relative to the adjacent architectural structure prior to installation of the headrail within the end brackets. Alternatively, the endcap and the end bracket of each valance mount may be formed integrally together.

It should be appreciated that, by configuring the endcaps of the valance assembly as part of the mounting structure for the headrail together with the end brackets, the need for conventional valance returns is eliminated, thereby avoiding the numerous installation and manufacturing challenges associated with such returns. For example, as opposed to separate valance returns that must be independently supported relative to the adjacent architectural structure, the endcaps and end brackets can be assembled together to form the disclosed valance mounts and subsequently mounted relative to the adjacent architectural structure. The headrail can then be installed relative to the valance mounts to allow the covering to be suspended relative to the valance mounts. In particular, for inside-mounted coverings, the disclosed valance mounts can be flush-mounted against the opposed walls of a window frame, thereby eliminating the gaps typically associated with conventional valance returns. In such instance, any additional tolerances or clearances can be accommodated between the end brackets and headrail, which is concealed from view. Moreover, unlike conventional valance returns, the disclosed valance mounts can accommodate any suitable depthwise installation location within a window frame without requiring re-sizing or reconfiguration of the mount.

Moreover, in embodiments in which the covering is configured as a slatted covering (e.g., a Venetian blind), the valance body of the valance assembly may, for example, be configured the same as the slats of the covering. Specifically, in several embodiments, the valance body may be configured the same as the slats such that the valance body is interchangeable with the slats of the covering and vice versa. As a result, the costs of designing and manufacturing the valance body may be greatly reduced, as the valance body can simply be considered as an additional slat of the covering. Additionally, by using one of the slats of the covering as a valance body for the valance assembly, a more uniform, consistent aesthetic appearance may be provided between the valance assembly and the remainder of the covering.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Referring now to the drawings, FIG. 1 illustrates a perspective view of one embodiment of a covering 20 for an architectural structure (not shown) in accordance with aspects of the present subject matter. In general, the covering 20 is configured to be installed relative to a window, door, or any other suitable architectural structure as may be desired. In one embodiment, the covering 20 may be configured to be mounted relative to an architectural structure to allow the covering 20 to be suspended or supported relative to the architectural structure. It should be understood that the covering 20 is not limited in its particular use as a window or door shade, and may be used in any application as a covering, partition, shade, and/or the like, relative to and/or within any type of architectural structure.

In several embodiments, the covering 20 may be configured as a "privacy" Venetian-blind-type extendable/retractable covering. For example, in the embodiment shown in FIG. 1, the covering 20 includes a headrail 22, a bottom rail 24, and a plurality of horizontally disposed parallel slats 26 configured to be supported between the headrail 22 and the bottom rail 24 via one or more cord ladders 28. Additionally, the covering 20 may also include a valance assembly 100 configured to be installed as a as a means for at least partially concealing the headrail 22, thereby providing a desired aesthetic appearance for the covering 20. As will be described in greater detail below with reference to FIGS. 2 and 3, the valance assembly 100 may, in several embodiments, include opposed valance mounts (e.g., a left or first valance mount 101A and a right or second valance mount 101B— referred to collectively as the valance mounts 101 or each generically as a valance mount 101) and a valance body 104 extending in a lateral direction of the covering 20 (e.g., as indicated by arrow L in FIG. 1) between the valance mounts 101 along a front side 48 of the covering 20, with the valance assembly 100 being configured to at least partially conceal the headrail 22 from view. Each valance mount 101 may generally include an endcap (a left or first endcap 102A for the first mount 101A and a right or second endcap 102B for the second mount 101B— referring to collectively as the endcaps 102 or each generically as an endcap 102). In addition, each valance mount 101 may include an end bracket (e.g., a first end bracket 23A for the first mount 101A and a second end bracket 23B for the second mount 101B (not shown—see FIG. 3)— referred to collectively as the end brackets 23 or each generically as an end bracket 23), with each end bracket 23 configured to be coupled to a respective endcap 102. Specifically, each endcap/bracket pair, as the assembled valance mount 101, may generally be configured to form the mounting structure for vertically supporting the lateral ends of the headrail 22 relative to the adjacent architectural structure. For instance, in several embodiments, the valance mount 101 may be flush-mounted against an adjacent architectural structure (e.g., the sidewall of a window frame) to allow the headrail 22 to be supported relative thereto without creating any lateral gaps between the mount 101 and the architectural structure.

As is generally understood, the slats 26 of the covering 20 may be rotatable or tiltable about their longitudinal axes by manipulating the cord ladders 28 to allow the slats 26 to be tilted between a horizontal or open position (e.g., as shown in FIG. 1) for permitting light to pass between the slats 26 and a closed position (not shown), wherein the slats 26 are substantially vertically oriented in an overlapping manner to occlude or block the passage of light through the covering 20. It should be appreciated that the cord ladders 28 may be manipulated to allow for the slats 26 to be tilted between their open and closed positions using, for example, a suitable tilt wand 30 or any other suitable control device forming part of a tilt system provided in operative association with the covering 20. For example, as is generally understood, the covering 20 may include one or more components of the tilt system within the headrail 22, such as a tilt station provided in operative association with each cord ladder 28 and a tilt rod coupled between the tilt wand 30 and the tilt stations. In such an embodiment, as the tilt wand 30 is manipulated by the user (e.g., by rotating the tilt wand 30 relative to the headrail 22), the tilt rod may be rotated to rotationally drive the tilt stations, thereby allowing front or rear ladder run (not shown) of each cord ladder 28 to be raised or lowered relative to the other ladder run to adjust the tilt angle of the slats 26.

Moreover, as shown FIG. 1, the covering 20 may also include one or more pairs of lift cords 32, 34 (separate from the cord ladders 28) forming part of a lift system 36 for moving the covering 20 in a heightwise direction (indicated by arrow H in FIG. 1) between a lowered or extended position (e.g., as shown in FIG. 1) and a raised or retracted position (not shown). For instance, as shown in FIG. 1, the covering 20 includes two pairs of lift cords 32, 34 extending between the headrail 22 and the bottom rail 24. Each lift cord pair in FIG. 1 includes a front lift cord 32 extending along a front side 48 of the covering 20, and a rear lift cord 34 extending along a rear side 50 of the covering 20. Specifically, each front lift cord 32 may be configured to extend between the headrail 22 and the bottom rail 24 along a front edge 26A of each slat 26, while each rear lift cord 34 may be configured to extend between the headrail 22 and the bottom rail 24 along an opposed rear edge 26B of each slat 26. In one embodiment, the front side 48 of the covering 20 may generally be defined by a vertical plane in which the front edges 26A of the slats 26 lie and which extends between the headrail 22 and the bottom rail 24. Similarly, in one embodiment, the rear side 50 of the covering 20 may generally be defined by a vertical plane in which the rear edges 26B of the slats 26 lie and which extends between the headrail 22 and the bottom rail 24. The front side 48 of the covering 20 is spaced apart from the rear side 50 of the covering 20 in a depthwise direction (indicated by arrow D in FIG. 1)

In several embodiments, each lift cord pair may be configured to extend to a corresponding lift station 38, 40 of the lift system 36 to control the vertical positioning of the bottom rail 24 relative to the headrail 22. For instance, in one embodiment, each lift cord pair may be operatively coupled to a respective lift station 38, 40 housed within the bottom rail 24. In such an embodiment, a bottom end (not shown) of each lift cord 32, 34 may be configured to be coupled to its associated lift station 38, 40 while an opposed end (not shown) of the lift cord 32, 34 may be configured to be coupled to the headrail 22. For example, each lift station 38, 40 may include a lift spool (not shown) for winding and unwinding the respective lift cords 32, 34. Thus, as the bottom rail 24 is raised relative to the headrail 22, each lift cord 32, 34 is wound around its respective lift spool. Similarly, as the bottom rail 24 is lowered relative to the headrail 22, each lift cords 32, 34 is unwound from its respective lift spool.

It should be appreciated that, in the illustrated embodiment, the covering 20 is configured as a privacy-type Venetian blind including pairs of lift cords 32, 34 extending along the front and rear sides of the slats 26. However, in other embodiments, the slats 26 may include two or more sets of vertically aligned route holes through which respective lift cords extend between the headrail 22 and the bottom rail 26. In such embodiments, each lift cord may, for example, extend vertically from the headrail 22 through a set of aligned route holes in the slats 26 to a corresponding lift station of the lift system 36.

Additionally, in the illustrated embodiment, the lift system 36 of the covering 20 may also include a lift rod 42 operatively coupled to the lift stations 38, 40 and a spring motor 44 operatively coupled to the lift rod 42. As is generally understood, the spring motor 44 may be configured to store energy as the bottom rail 24 is lowered relative to the headrail 22 and release such energy when the bottom rail 24 is being raised relative to the headrail 22 to assist in moving the covering 20 to its retracted position. It should be appreciated that, in one embodiment, the spring motor 44 may be overpowered. In such an embodiment, to prevent unintended motion of the bottom rail 24 relative to the headrail 22, a brake assembly 52 may be provided within the bottom rail 24 and may be operatively coupled to the lift rod 42 to stop rotation of the lift rod 42. As shown in FIG. 1, the brake assembly 52 may include an actuator button 54 coupled to or otherwise supported by the bottom rail 24. To actuate the brake assembly 52, the button 54 that can be depressed to release or disengage the brake assembly 52 from the lift rod 42, thereby allowing the lift rod 42 to be rotated in a manner that permits the lift cords 32, 34 to be wound around or unwound from their respective lift spools as the bottom rail 24 is lowered or raised, respectively, relative to the headrail 22. In other embodiments, the spring motor 44 may not be overpowered, thereby eliminating the need for the brake assembly 52. For example, in one embodiment, the spring motor 44 may be adapted to provide a variable torque, thereby allowing the lift system 36 to be configured as a balanced operating system.

It should be appreciated that the configuration of the covering 20 described above and shown in FIG. 1 is provided only to place the present subject matter in an exemplary field of use. Thus, it should be apparent that the present subject matter may be readily adaptable to any suitable manner of covering configuration.

Figure 2:
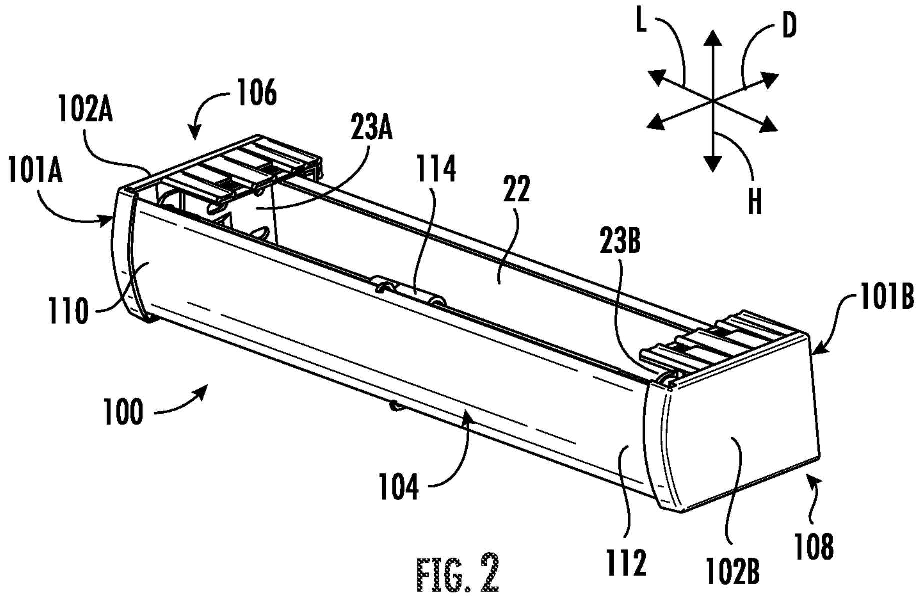
FIG. 2 illustrates a perspective view of one embodiment of a valance assembly configured for use with a covering for an architectural structure in accordance with aspects of the present subject matter, particularly illustrating components of the valance assembly installed relative to a headrail of a covering.
Figure 3:
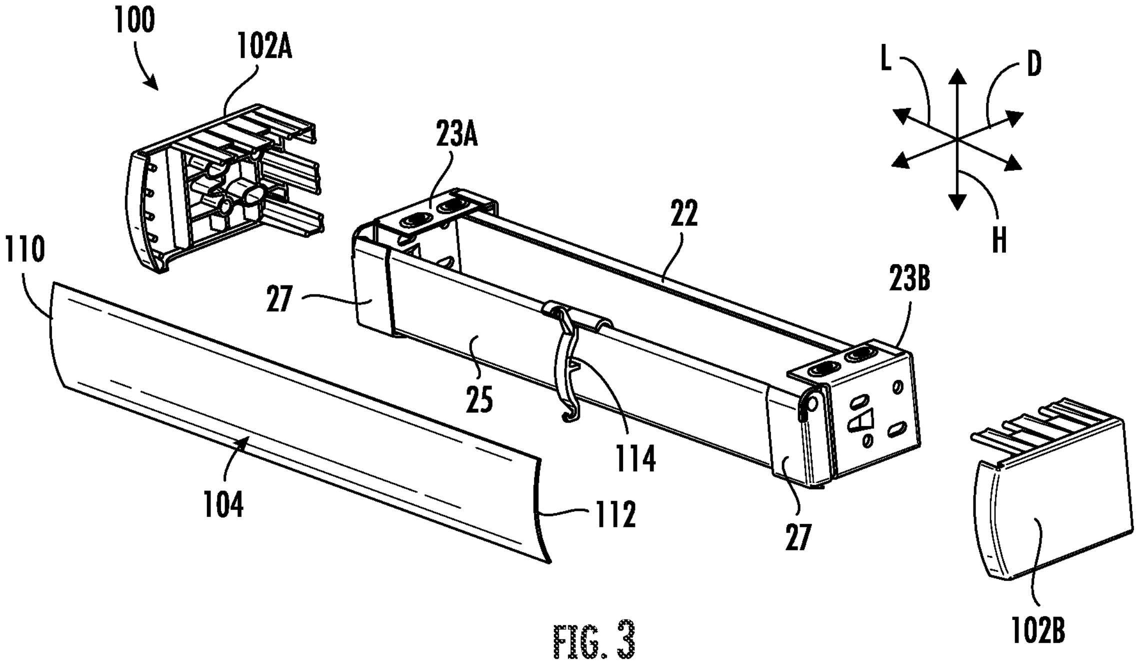
FIG. 3 illustrates a partially exploded view of the valance assembly shown in FIG. 2, with endcaps and a valance body of the assembly being exploded away from the headrail and associated end brackets of the assembly.

Referring now to FIGS. 2 and 3, different views of one embodiment of a valance assembly 100 configured for use with a covering for an architectural structure (e.g., covering 20 described above with reference to FIG. 1) are illustrated in accordance with aspects of the present subject matter. Specifically, FIG. 2 illustrates a perspective view of the valance assembly 100 as installed relative to the headrail 22 described above with reference to FIG. 1. Additionally, FIG. 3 illustrates a partially exploded view of the valance assembly 100 shown in FIG. 2, with the endcaps 102 and valance body 104 being exploded away from the headrail 22 and the associated end brackets 23 of the assembly 100.

As indicated above, the valance assembly 100 includes opposed first and second valance mounts 101A, 102B (FIG. 2), with the first valance mount 101A including both a first endcap 102A and an associated first end bracket 23A and the second valance mount 101B including both a second endcap 102B and an associated second end bracket 23B. In addition, the valance assembly 100 includes a valance body 104 extending between the valance mounts 101 in the lateral direction L. As particularly shown in FIG. 2, the valance assembly 100 is generally configured to extend in the lateral direction L between a first lateral end 106 and a second lateral end 108, with the first endcap 102A being positioned at and/or at least partially defining the first lateral end 106 of the valance assembly 100 and the second endcap 102B being positioned at and/or at least partially defining the second lateral end 108 of the valance assembly 100.

In general, each endcap 102 may be configured to be coupled to an associated end bracket 23 of the valance assembly 100 to form the respective valance mount 101. For instance, as shown in FIG. 2, the first endcap 102A may be coupled to the first end bracket 23A and the second endcap 102B may be coupled to the second end bracket 23B. As will be described in greater detail below with reference to FIGS. 4-7, each endcap 102 may be configured to be coupled to its respective end bracket 23 prior to mounting such endcap/bracket assembly (i.e., as the valance mount 101) relative to the adjacent architectural structure along which the associated covering 20 is to be installed (e.g., a window frame). Specifically, once assembled together, each valance mount 101 may be installed relative to the adjacent architectural structure, such as along the inside of a window frame for an inside mount or along the exterior of the window frame for an outside mount. After mounting both valance mounts 101 relative to the adjacent architectural structure, the associated covering 20 can be installed relative to the valance mounts 101, such by inserting the lateral ends of the headrail 22 of the covering 20 into the opposed end brackets 23A.

The valance body 104 of the valance assembly 100 may generally be configured to extend between the endcaps 102 of the valance mounts 101 so as to at least partially cover or conceal the front portions of the headrail 22 (and the end brackets 23) when the associated covering 20 is viewed from its front side. As shown in FIGS. 2 and 3, the valance body 104 extends in the lateral direction L between a first body end 110 and a second body end 112, with the first end 110 configured to be coupled to and/or received within a portion of the first endcap 102A and the second end 112 configured to be coupled to and/or received within a portion of the second endcap 102B. For instance, as will be described below with reference to FIGS. 4-7, the first and second ends 110, 112 of the valance body 104 may be configured to be received within respective valance retention channels of the endcaps 102 that define a shape or profile matching or substantially matching the shape or profile of the valance body 104.

As shown in FIG. 2, when installed between the endcaps 102 relative to the headrail 22 (and associated end brackets 23), the valance body 104 may generally be configured to extend adjacent to a front wall 25 (FIG. 3) of the headrail, thereby allowing the valance body 104 to cover the front wall 25 of the headrail 22 as well as forward-facing walls or pivot doors 27 (FIG. 3) of the end brackets 23. Additionally, as shown in FIG. 3, in one embodiment, the valance assembly 100 may optionally include one or more valance clips 114 for supporting the valance body 104 relative to the headrail 22 at one or more corresponding locations between the endcaps 102. However, it should be appreciated that, in other embodiments, the valance clip(s) 114 need not be included. For instance, in certain embodiments, the vertical support provided at the lateral ends 110, 112 of the valance body 104 via the endcaps 102 may be sufficient to support the valance body 104 along its length without the need for valance clips 114.

It should be appreciated that the valance body 104 may generally be configured to have any suitable shape, profile, and/or design so as to provide the desired aesthetic appearance for the valance assembly 100. However, in accordance with one or more aspects of the present subject matter, the valance body 104 may be designed or configured to have the same shape, profile, dimensions, etc. as the slats used in the associated covering. For instance, in the illustrated embodiment, the valance body 104 corresponds to one of the slats 26 shown in FIG. 1 such that the valance body 104 is interchangeable with the each of the slats 26 and vice versa. In such an embodiment, the valance body 104 may be provided as part of the valance assembly 100 without requiring additional design and/or manufacturing efforts, as the valance body 104 may simply correspond to an additional slat of the covering. As a result, the disclosed configuration can provide substantial component and/or manufacturing cost savings. Moreover, by using a slat of the associated covering as the valance body 104, a more uniform, consistent look or appearance can be provided between the valance assembly 100 and the remainder of the covering 20.

Figure 4:
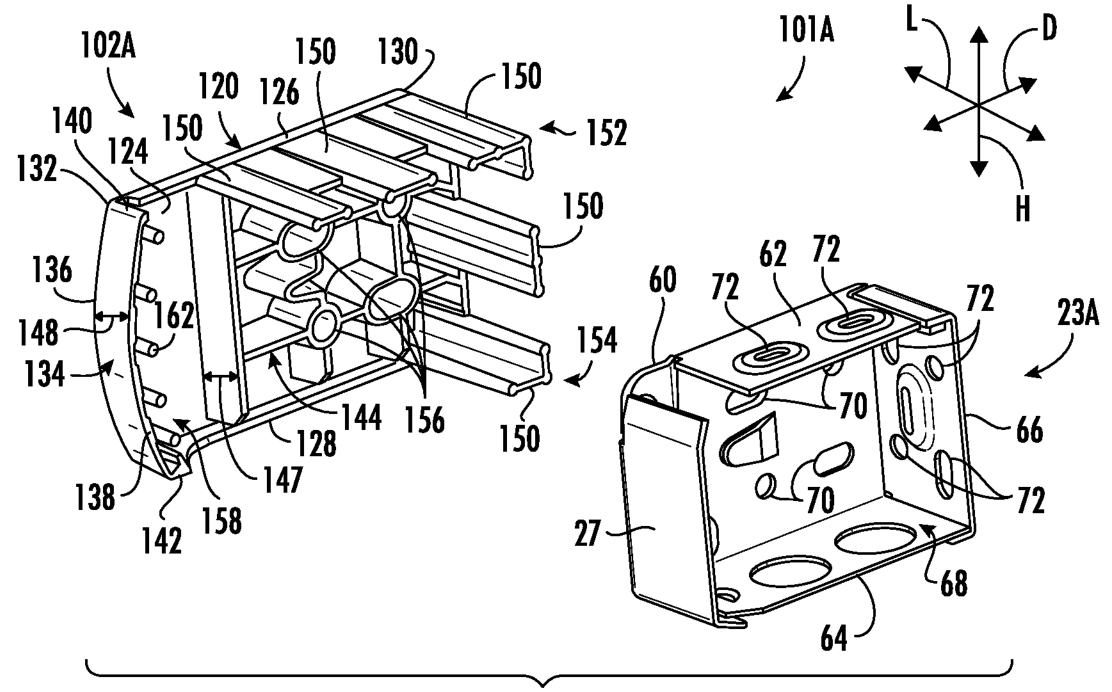
FIG. 4 illustrates a perspective view of one of the valance mounts of the valance assembly shown in FIGS. 2 and 3, particularly illustrating the endcap of the valance mount exploded away from the end bracket of the valance mount.
Figure 5:
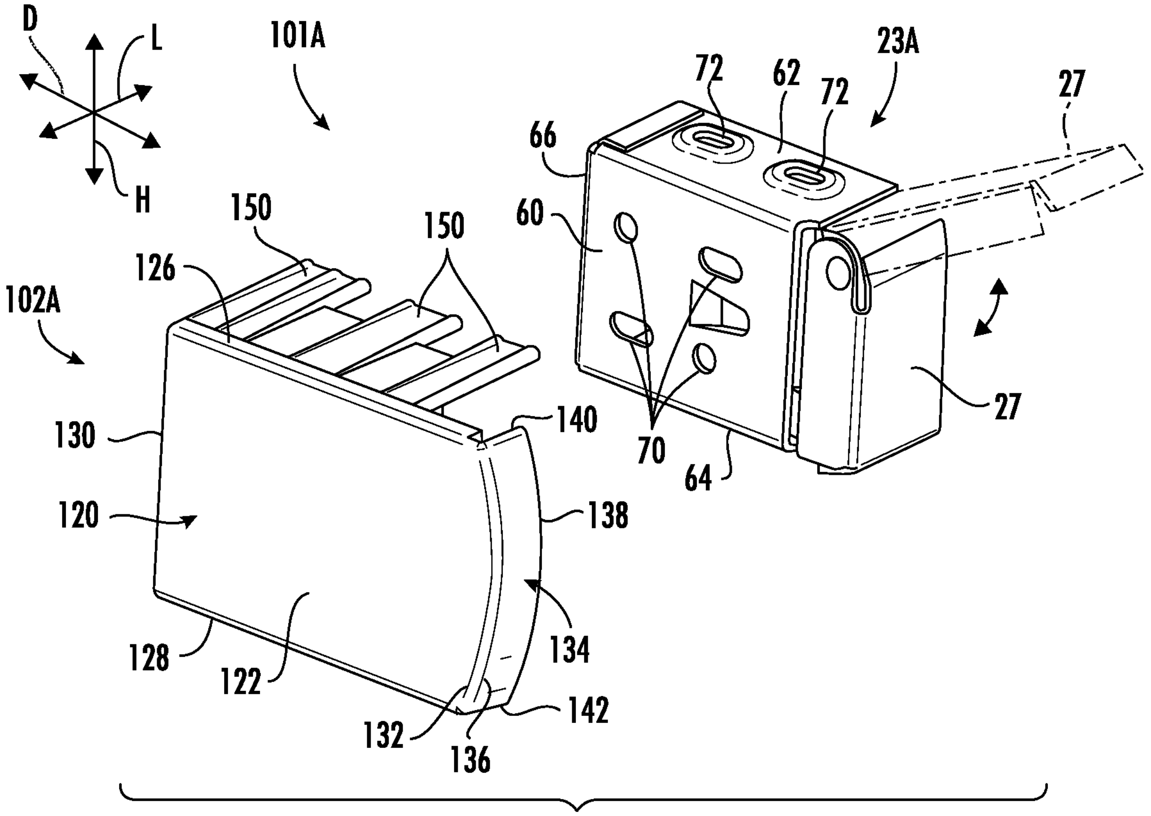
FIG. 5 illustrates an opposed perspective, exploded view of the valance mount shown in FIG. 4.
Figure 6:
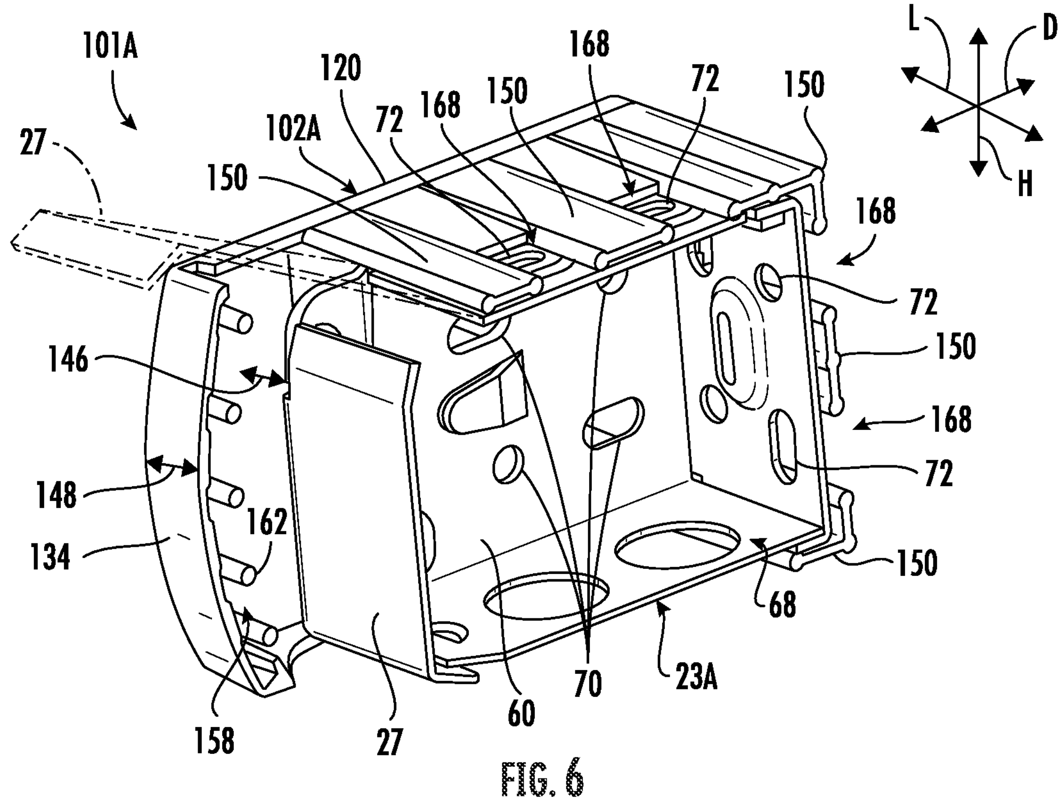
FIG. 6 illustrates an assembled view of the valance mount shown in FIG. 4.
Figure 7:
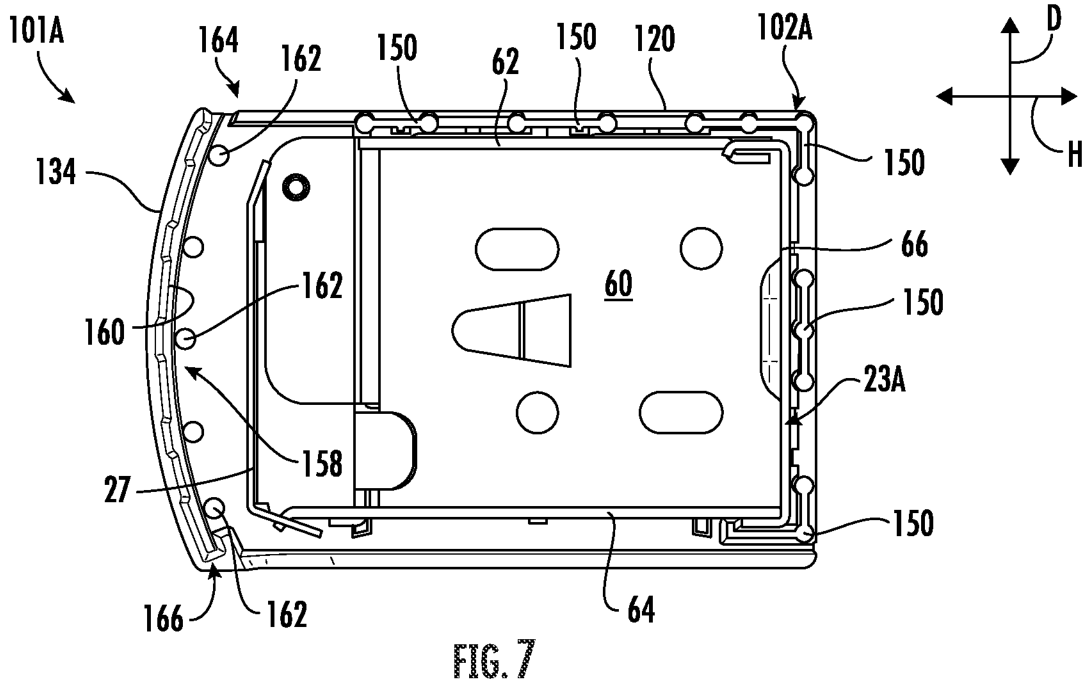
FIG. 7 illustrates an interior lateral view of the assembled valance mount shown in FIG. 6.

Referring now to FIGS. 4-7, several views of the first valance mount 101A described above with reference to FIGS. 2 and 3 are illustrated in accordance with aspects of the present subject matter. Specifically, FIGS. 4 and 5 illustrate opposing perspective, exploded views of the first valance mount 101A. Additionally, FIG. 6 illustrates an assembled view of the valance mount 101 shown in FIG. 4, and FIG. 7 illustrates an interior lateral view of the assembled valance mount 101A shown in FIG. 6. It should be appreciated that, although not shown in FIGS. 4-7, the second valance mount 101B is generally configured the same as the valance mount 101A shown in FIGS. 4-7 except for being mirrored to allow the mount to be installed on the opposed sides of the valance assembly 100 and headrail 22. As such, one of ordinary skill in the art will appreciate that the description of the first endcap 102A and first end bracket 23A provided below with reference to FIGS. 4-7 is also applicable to the second endcap 102B and second end bracket 23B.

As shown in FIGS. 4 and 5, the end bracket 23A includes a base bracket wall 60 forming a closed lateral end of the bracket 23A and a plurality of peripheral bracket walls 62, 64, 66, 27 extending in the lateral direction L from the base wall 60 towards an open lateral end of the bracket 23A. For example, in the illustrated embodiment, the end bracket 23A includes opposed top and bottom bracket walls 62, 64 extending from the base bracket wall 60 in the lateral direction L along the top and bottom sides, respectively, of the bracket 23A and opposed rear and front sidewalls 66, 27 extending from the base bracket wall 60 in the lateral direction L along the rear side of the bracket 23A. The base wall and various peripheral walls 62, 64, 66, 27 generally form an open-ended cavity 68 through which the headrail 22 is configured to extend when it is installed relative to the bracket 23. It should be appreciated that the bottom wall 64 of the bracket 23A may generally be configured to function as or otherwise form a shelf or vertical support member that vertically supports the adjacent lateral end of the headrail 22 relative to the valance mount 101A. Specifically, with the headrail 22 installed relative to the bracket 23, the adjacent lateral end of the headrail 22 may rest on top of the bottom wall 64 of the bracket 22. In this regard, the bottom wall 64 of the bracket 22 may provide the sole vertical support structure for the adjacent lateral end of the headrail 22 without the need for such lateral end of the headrail 22 to be directly connected or coupled to any of the other bracket walls 62, 66, 27 or the base wall 60 of the end bracket 23A.

In several embodiments, the front sidewall of the bracket 23A may generally be formed or defined by a front pivoting bracket door 27 of the bracket 23A, thereby allowing the front side of the bracket 23A to be selectively accessed via the bracket door 27. As shown in the illustrated embodiment, the bracket door 27 is configured to be pivoted relative to the remainder of the bracket 23A between a closed position (i.e., as shown in solid lines in FIGS. 4-7), at which the bracket door 27 is substantially vertically oriented and extends opposite the rear sidewall 66 so as to function as the front sidewall of the bracket 23A, and an opened position (i.e., as shown in the dashed lines in FIGS. 5 and 6), at which the bracket door 27 is pivoted upwardly to provide access to the interior of the internal cavity 68 of the bracket 23A along its front side. Thus, when installing the headrail 22 relative to the end bracket 23A, the bracket door 27 may be pivoted to its opened position to allow the adjacent lateral end of the headrail 22 to be inserted in the depthwise direction D between the top and bottom walls 62, 64 of the bracket 23A through the opening provided by the door 27. Once the lateral end of the headrail 22 has been sufficiently inserted into the interior of the bracket 23A, the bracket door 27 can be pivoted to its closed position to trap the lateral end of the headrail 22 in the depthwise direction D between the rear sidewall 66 and the front door 27 (e.g., as is shown in FIG. 3).

It should be appreciated that, in the illustrated embodiment, the end bracket 23A is configured as a box bracket including the base bracket wall 60 and the four peripheral bracket walls 62, 64, 66, 27 extending outwardly from the base wall 60 in the lateral direction L to form the open-ended cavity 68. However, in other embodiments, the disclosed end brackets 23 may have any other suitable configuration that allows each bracket 23 to vertically support a headrail 22 relative to an adjacent architectural structure. For instance, in one embodiment, each end bracket 23 may simply include a base wall (e.g., base wall 60) and a bottom wall (e.g., bottom wall 64) extending outwardly from the base wall in the lateral direction L, with the bottom wall generally being configured to function as or otherwise form a shelf or vertical support member that vertically supports the adjacent lateral end of the headrail 22 relative to the associated valance mount. In another embodiment, each end bracket 23 may include a base wall (e.g., base wall 60) and two peripheral walls (or two or more peripheral walls) extending outwardly from the base wall in the lateral direction L, with one of such peripheral walls corresponding to a bottom wall that functions to vertically supports the adjacent lateral end of the headrail 22 relative to the associated valance mount. For instance, in addition to the bottom wall, a top wall (e.g., top wall 52) and/or a rear wall (e.g., rear sidewall 66) may extend from the base wall in the lateral direction L to provide additional locations for mounting the associated valance mount relative to the adjacent architectural structure.

Referring particularly still to FIGS. 4 and 5, the endcap 102A of the valance mount 101A includes an end wall 120 extending in the lateral direction L between an outer surface 122 (FIG. 5) and an inner surface 124 (FIG. 4), with the outer surface 122 being configured to generally define one of the lateral ends of the valance assembly 100 (e.g., the first lateral end 106 (FIG. 2) of the valance assembly 100 when referring to the first endcap 102A). The end wall 120 also extends in the heightwise direction H between a top end 126 and a bottom end 128 and the depthwise direction D between a rear end 130 and a front end 132. In several embodiments, the inner and outer surfaces 124, 122 of the end wall 120 may correspond to planar surfaces, with each surface defining a plane extending in the heightwise and depthwise directions H, D.

Additionally, the endcap 102A also includes a front wall 134 extending outwardly in the lateral direction L from the end wall 120 between a proximal end 136 positioned adjacent to the front end 132 of the end wall 120 and a distal end 138 positioned opposite the proximal end 136. For instance, the front wall 134 may generally be configured to extend outwardly from the front end 132 of the end wall 120 at approximately a 90 degree angle such that the front wall 134 extends in the lateral direction L from its proximal end 136 to its distal end 138 generally perpendicular to the outer surface 122 of the end wall 120. In several embodiments, the front wall 134 may be configured to define a heightwise and/or depthwise profile or shape that matches the corresponding shape or profile of the valance body 104 of the valance assembly 100. For instance, as shown in FIGS. 4 and 5, the front wall 134 defines a curved profile or shape as it extends in the heightwise direction between a top end 140 and a bottom end 142 of the front wall 134 that generally matches the curved profile or shape of the valance body 104 described above with reference to FIGS. 2 and 3 (and, thus, also matches the curved shape or profile of the slats 26 shown in FIG. 1 in embodiments in which the body 104 corresponds to one of the slats of the associated covering 20).

Moreover, in several embodiments, the endcap 102A further includes a spacer 144 that functions to offset the bracket door 27 of the end bracket 23A from the end wall 120 of the endcap 102A by a given lateral offset distance 146 (FIG. 6). Specifically, in the illustrated embodiment, the spacer 144 is formed by a plurality of heightwise and depthwise oriented ribs that extend outwardly from the inner surface 124 of the end wall 120 by a given lateral distance 147 (FIG. 4). Alternatively, the spacer 144 may be configured as continuous surface or platform that functions to offset the end bracket 23A from the end wall 120 of the endcap 102A. Regardless, when the bracket 23A is installed relative to the endcap 102A as shown in FIG. 6, the base wall 60 of the bracket 23A is configured to abut against the spacer 144, thereby offsetting the bracket door 27 of the bracket 23A from the end wall 120 by at least the lateral offset distance 146.

In several embodiments, the lateral offset distance 146 is selected based on a lateral dimension of the front wall 134 of the endcap 102A such that the bracket door 27 is capable of being opened and closed without contacting the front wall 134 when the bracket 23A is installed relative to the endcap 102A. For instance, in one embodiment, the lateral offset distance 146 may be greater than (e.g., slightly greater than) a corresponding lateral distance 148 (FIGS. 4 and 6) defined between the inner surface 124 of the end wall 120 and the distal end 138 of the front wall 134. In such an embodiment, as shown in FIG. 6, the bracket door 27 may be clear of the front wall 134 in the lateral direction L, thereby allowing the door 27 to be pivoted between its closed position (solid lines) and opened position (dashed lines) despite the bracket 23A being installed relative to the endcap 102A. Thus, as described above, the endcap 102A and bracket 23A may be initially assembled together to form the valance mount 101A and subsequently installed relative to an adjacent architectural structure prior to the headrail 22 being inserted within the bracket 23A. Once the valance mount 101A has been positioned as desired relative to the adjacent architectural structure, the headrail 22 may then be installed within the bracket 23A without requiring disassembly of the valance mount 101A.

In several embodiments, the endcap 102A may also include one or more alignment features for properly aligning the bracket 23A relative to the endcap 102A. For example, in the illustrated embodiment, the endcap 102A includes a plurality of alignment fingers or tabs 150 extending outwardly from the end wall 120 along its outer perimeter, such as by extending outwardly in the longitudinal direction L from one or more locations along the top and/or bottom ends 126, 128 of the end wall 120 and/or one or more locations along the rear end 130 of the end wall 120. In one embodiment, the positioning or arrangement of the alignment tabs 150 may be selected such that the tabs 150 form a partial guide channel within which the bracket 23A can be inserted as it is being installed relative to the endcap 102A. For instance, as shown in FIG. 4, the spaced apart alignment tabs 150 collectively form a slotted guide wall that: (1) extends along a portion of the top side of endcap 102A; (2) transitions from the top side of the endcap 102A to the rear side thereof (e.g., at corner 152); (3) extends along the rear side of the endcap 102A; (4) transitions from the rear side of the endcap 1102A to the bottom side thereof (e.g., at corner 154); and (5) extends along a portion of the bottom side of the endcap 102A, thereby forming a three-sided guide channel. In such an embodiment, the bracket 23A may be inserted within the guide channel formed by the alignment tabs 150 to properly align the bracket 23A relative to the endcap 102A.

Once the bracket 23A has been properly aligned with the endcap 102A and seated against the spacer 144 of the endcap 102A, the bracket 23A may, for example, be coupled to the endcap 102A (and the adjacent architectural structure) using suitable fasteners. For instance, as shown in FIG. 4, fastener openings 70 defined in the base wall 60 of the bracket 23A may be configured to be aligned with corresponding fastener openings 156 defined in the endcap 102A, thereby allowing the components to be coupled together using one or more suitable fasteners. When the endcap/bracket assembly is being installed as an inside mount, one or more fasteners may be inserted through one or more of the aligned openings 70, 156 and then extend through the end wall 120 of the endcap 102A and into the adjacent architectural structure (e.g., into the window frame) to secure the endcap/bracket assembly relative thereto. Additionally, fastener openings 72 formed in the top and/or rear walls 62, 66 of the bracket 23A may also be used to facilitate coupling the bracket 23A (and the endcap 102A coupled thereto) to a portion of the adjacent architectural structure (e.g., the interior or exterior of a window frame depending on the mounting configuration). As particularly shown in FIG. 6, such additional fastener openings 72 may be configured to be aligned with corresponding gaps 168 defined between adjacent alignment tabs 150 of the endcap 102A to allow suitable fasteners to pass through the gaps 168 and into the adjacent architectural structure to which the endcap/bracket assembly is being mounted. Regardless of whether the fasteners are inserted through the end wall 120 of the endcap 102A and/or the top and/or rear walls 62, 66 of the bracket 23A, the endcap/bracket assembly is capable of being flush-mounted against the sidewalls of the window frame or other adjacent architectural structure when inside-mounting the valance mount 101, thereby eliminating any lateral gaps that would otherwise exist when using conventional valance treatments.

Referring particularly to FIGS. 6 and 7, the endcap 102A may also define a retention slot or channel for supporting the valance body 104 of the valance assembly 100 relative to the endcap 102A. Specifically, as shown in the illustrated embodiment, the endcap 102A defines a curved valance retention channel 158 for receiving the adjacent lateral end of the valance body (e.g., lateral end 110 of the valance body 104 (FIG. 3), with the shape or profile of the valance retention channel 158 generally matching the shape or profile of the valance body 104. For example, as particularly shown in FIG. 7, the valance retention channel 158 is defined in the depthwise direction D between a curved inner surface 160 of the front wall 134 of the endcap 102A and a plurality of spaced apart retention elements 162 (e.g., posts) extending outwardly from the end wall 120 of the endcap 102A. In other embodiments, the spaced apart retention elements 162 may be replaced, for instance, with a continuous wall forming the side of the valance retention channel 158 opposite the front wall 134 of the endcap 102A. Additionally, as shown in FIG. 7, the valance retention channel 158 extends in the heightwise direction H between an open end 164 positioned along the top side of the endcap 102A and a closed end 166 positioned adjacent to the bottom end of the endcap 102A. As such, when the respective lateral end of the valance body 104 is inserted within the valance retention channel 158, such end of the valance body 104 may be vertically supported via the closed end 166 of the valance retention channel 158 while being trapped or retained in the depthwise direction D between the front wall 134 of the endcap 102A and the retention element(s) 162 forming the opposed side of the channel 158.

It should be appreciated that, as described above, each valance mount 101 includes an end cap 102 and a separate end bracket 23. However, in other embodiments, the end cap 102 and end bracket 23 of each valance mount 101 may be formed integrally, such as by configuring each endcap 102 to include one or more of the bracket-related features and/or components described above. For instance, as an alternative to the alignment tabs 150, each endcap 102 may include one or more bracket walls extending outwardly from the end wall 120 and/or the spacer 144 in the lateral direction L for supporting an adjacent lateral end of a headrail 22. Specifically, in one embodiment, each endcap may include four bracket walls extending outwardly from the end wall 120 and/or the spacer 144 in the lateral direction L (e.g., top, bottom, front, and rear walls) to form a box-bracket-type configuration for receiving the lateral end of the headrail. In such an embodiment, the front bracket wall of the endcap 102 may, for instance, be formed by or incorporate a bracket door for inserting the lateral end of the headrail 22 into the "bracket" formed by the endcap, while the bottom bracket wall of the endcap 102* may function as a shelf for vertically supporting the adjacent lateral end of the headrail 22.

Figure 8:
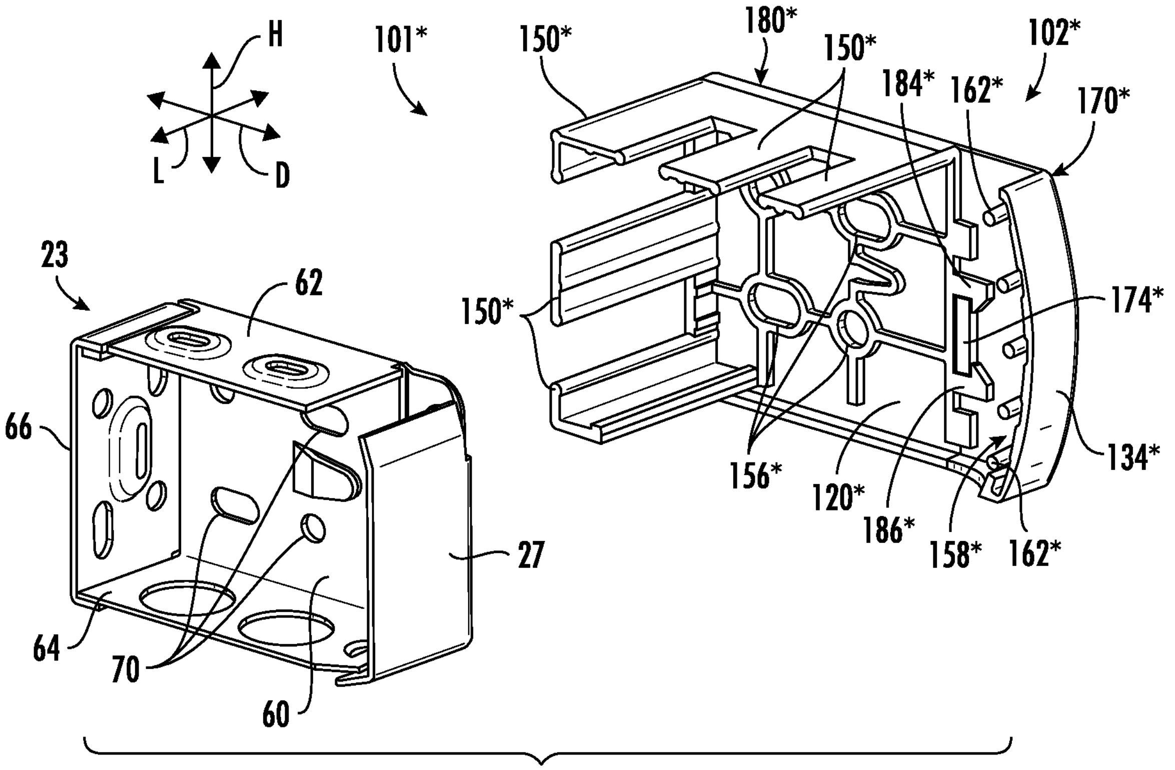
FIG. 8 illustrates a perspective view of an alternative embodiment of a valance mount suitable for use within the disclosed valance assembly in accordance with aspects of the present subject matter, particularly illustrating an endcap of the valance mount and an associated end bracket of the valance mount, with the end bracket being exploded away from the endcap.
Figure 9:
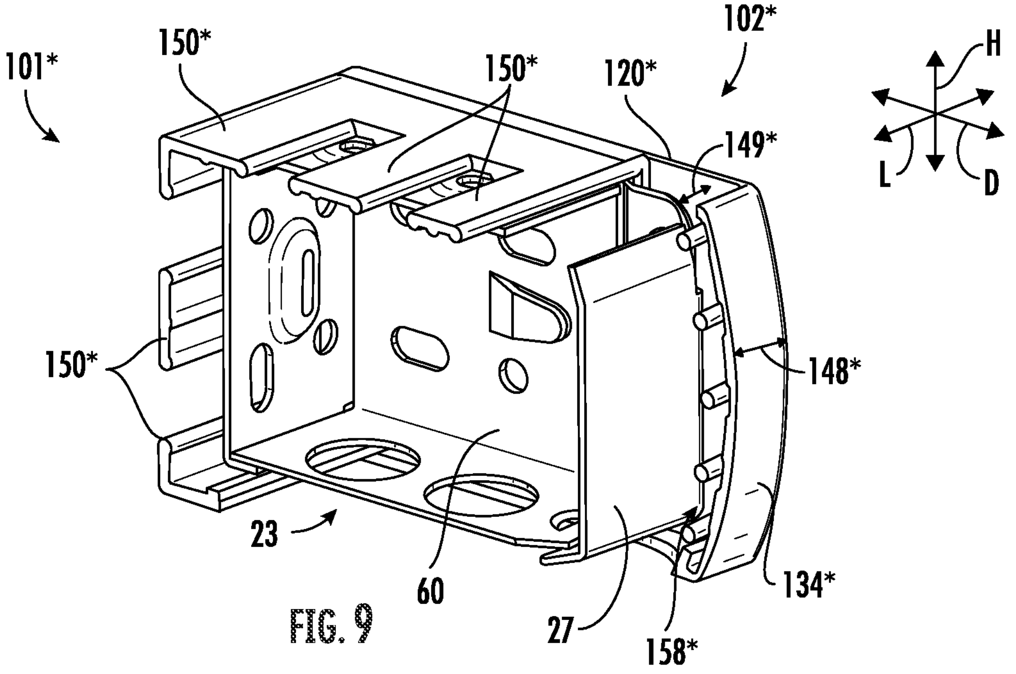
FIG. 9 illustrates a perspective, assembled view of the valance mount shown in FIG. 8.
Figure 10:
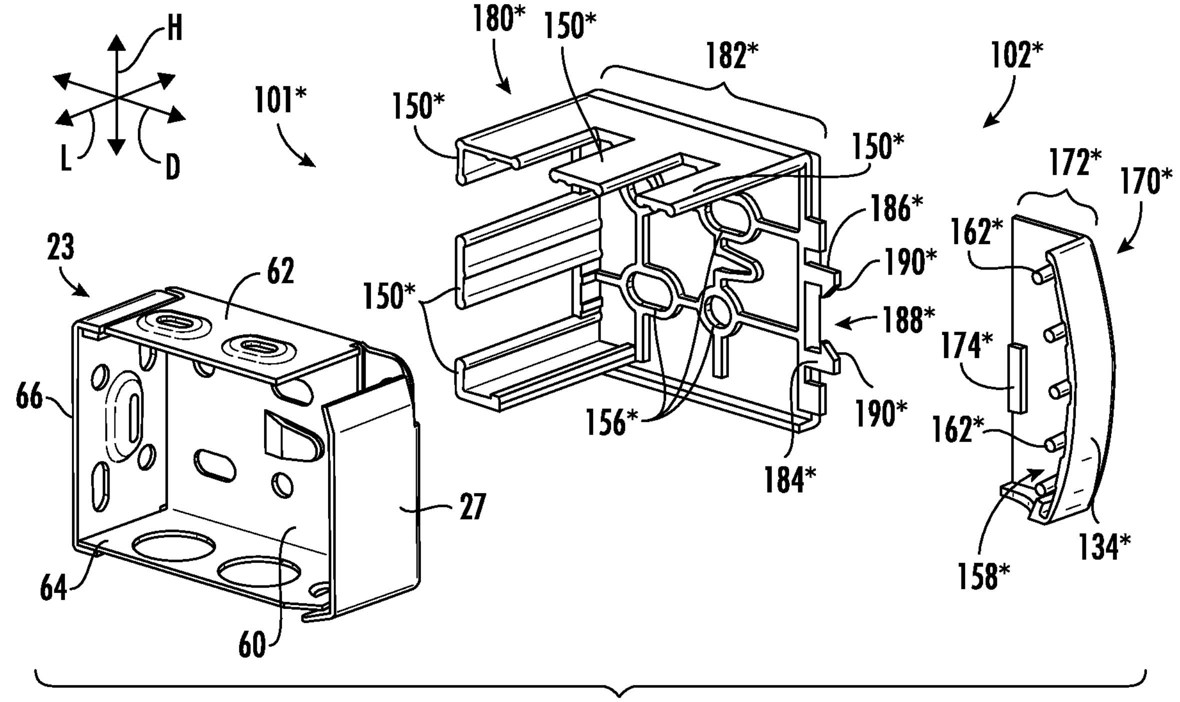
FIG. 10 illustrates a similar view of the valance mount as that shown in FIG. 8 (i.e., with the bracket exploded away from the endcap) except that a front portion of the endcap has been further exploded away from a rear portion of the endcap.
Figure 11:
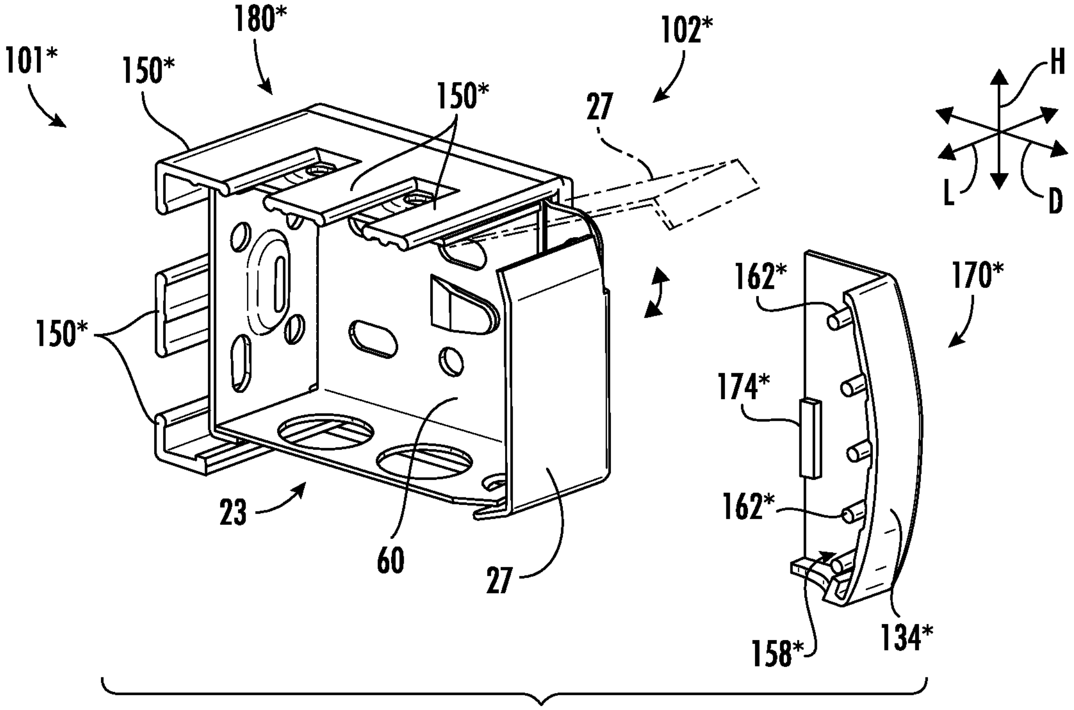
FIG. 11 illustrates a similar view of the valance mount as that shown in FIG. 9 (i.e., with the end bracket assembled relative to the endcap) except that the front portion of the endcap has been exploded away from the rear portion of the endcap.

Referring now to FIGS. 8-11, several views of an alternative embodiment of a valance mount 101* suitable for use within the disclosed valance assembly 100 are illustrated in accordance with aspects of the present subject matter. Specifically, FIG. 8 illustrates a perspective view of both an endcap 102* and an associated end bracket 23 of the valance mount 101* (with the end bracket 23 being exploded away from the endcap 102*) and FIG. 9 illustrates a perspective, assembled view of the valance mount 101* shown in FIG. 8. FIG. 10 illustrates a similar view of the valance mount 101* as that shown in FIG. 8 (i.e., with the bracket 23 exploded away from the endcap 102*) except that a front portion 170* of the endcap 102* has been further exploded away from a rear portion 180* of the endcap 102*. Additionally, FIG. 11 illustrates a similar view of the valance mount 101* as that shown in FIG. 9 (i.e., with the end bracket 23 installed relative to the endcap 102*) except that the front portion 170* of the endcap 102* has been exploded away from the rear portion 180* of the endcap 102*.

It should be appreciated that the endcap 102* of the valance mount 101* shown in FIGS. 8-11 is generally configured similar to the endcaps 102 described above with reference to FIGS. 2-7. As such, components, features, and/or structures of the endcap 102* that are the same or similar to corresponding components, features, and/or structures of the endcaps 102 described above will be designated by the same reference character with an asterisk (*) added. Additionally, when a given component, feature, and/or structure of the endcap 102* is configured to generally perform the same function as the corresponding component, feature, and/or structure of the endcaps 102 described above, a less detailed description of such component/feature/structure will be provided below for the sake of brevity. It should also be appreciated that the end bracket 23 of the valance mount 101* shown in FIGS. 8-11 is configured the same as the end brackets 23 described above with reference to FIGS. 2-7. As such, the same reference characters as those used above for FIGS. 2-7 will be used to identify the same components, features, and/or structures of the end bracket 23 shown in FIGS. 8-11.

As particularly shown in FIG. 8, the endcap 102* of the valance mount 101* includes an end wall 120* configured to generally define one of the lateral ends of the valance assembly 100 and a front wall 134* extending outwardly in the lateral direction L from the end wall 120* (e.g., at a 90 degree angle). Similar to the front wall 134 of the endcap 102 described above, the front wall 134* of the endcap 102* shown in FIG. 8 may be configured to define a heightwise and/or depthwise profile or shape that matches the corresponding shape or profile of the valance body 104 of the valance assembly 100 (and, thus, may also match the curved shape or profile of the slats 26 shown in FIG. 1 in embodiments in which the valance body 104 corresponds to an additional slat 26 of the covering 20). Additionally, similar to the endcap 102 described above, the endcap 102* shown in FIG. 8 includes one or more alignment features for properly aligning the bracket 23 relative to the endcap 102*, such as a plurality of alignment fingers or tabs 150* extending outwardly from the end wall 120* along its outer perimeter (e.g., by extending outwardly in the longitudinal direction L from one or more locations along the top and/or bottom ends of the end wall 120* and/or one or more locations along the rear end of the end wall 120*) and further defines one or more fastener openings 156* configured to be aligned with one or more corresponding fastener openings 70 defined in the bracket 23 for coupling the bracket 23 to the endcap 102* and/or for coupling the valance mount 101* to an adjacent architectural structure. Moreover, as shown in FIG. 8, the endcap 102* may also define a retention slot or channel for supporting the valance body 104 of the valance assembly 100 relative to the endcap 102*, such as by defining a curved valance retention channel 158* configured the same as the valance retention channel 158 described above for receiving the adjacent lateral end of the valance body 104. For example, as particularly shown in FIG. 8, the valance retention channel 158* is defined in the depthwise direction D between a curved inner surface of the front wall 134* of the endcap 102* and a plurality of spaced apart retention elements 162* (e.g., posts) extending outwardly from the end wall 120* of the endcap 102*.

However, unlike the embodiment described above, the endcap 102* shown in FIGS. 8-11 does not include a spacer that functions to offset the bracket door 27 of the box bracket 23 from the end wall 120* of the endcap 102* by a lateral offset distance that is greater than a lateral distance 148* (FIG. 9) defined between the inner surface of the end wall 120* and the distal end of the front wall 134*. Rather, in the illustrated embodiment, the endcap 102* is generally configured such that the base wall 60 of the end bracket 23 is seated flush against or is otherwise positioned generally adjacent to the end wall 120* of the endcap 102*. As a result, as shown in FIG. 9, the bracket door 27 of the end bracket 23 is spaced apart from the end wall 120* of the endcap 102* by a lateral distance 149* that is significantly less than the lateral distance 148* defined by the front wall 134*. As such, with the end bracket 23 installed relative to the endcap 102* and with the endcap 102* fully assembled (e.g., as shown in FIG. 8), the bracket door 27 of the end bracket 23 is not capable of clearing the front wall 134* when attempting to move the door 27 from its closed position to its opened position. Specifically, with the endcap/bracket assembled as shown in FIG. 8, the bracket door 27 would contact the front wall 134* of the endcap 102* (or the retention elements 162* positioned adjacent thereto) as one attempted to pivot the door 27 upwardly towards its opened position.

Accordingly, to accommodate opening/closing of the bracket door 27 (and, thus, to facilitate installation of the headrail 22 relative to the bracket 23 when the endcap 102* and bracket 23 are assembled together to form the valance mount 101*), the endcap 102* has been designed as a two-piece construction or assembly including both a rear endcap portion 180* and a front endcap portion 170*, with the front endcap portion 170* configured to be selectively decoupled from and/or moved relative to the rear endcap portion 180* to allow the door 27 to be pivoted between its opened and closed positions. Specifically, as shown in FIG. 10, the rear endcap portion 180* of the endcap 102* generally forms a rearward depthwise section 182* of the end wall 120* and also includes or accommodates various other components, features, and/or structures of the endcap 102*, such as the alignment tabs 150* and the fastener openings 156*. Additionally, as shown in FIG. 10, the front endcap portion 170* of the endcap 102* generally forms a forward depthwise section 172* of the end wall 102* and also includes or accommodates various other components, features, and/or structures of the endcap 102*, such as the front wall 134*, the retention elements 162*, and the valance retention channel 158*.

To allow the front endcap portion 170* to be selectively decoupled from and/or moved relative to the rear endcap portion 180*, the endcap portions 170*, 180* may, in several embodiments, include mating engagement features or other suitable coupling features. For instance, as particularly shown in FIG. 10, the rear endcap portion 180* includes first and second engagement members 184*, 186* extending outwardly from the rearward depthwise section 182* of the end wall 102* in the depthwise direction D at spaced apart locations (e.g., in the heightwise direction H) such that an engagement channel 188* is defined between the engagement members 184*, 186* for receiving a corresponding engagement feature of the front endcap portion 170*. Specifically, as shown in FIG. 10, the front endcap portion 170* includes an engagement tab 174* extending outwardly from the forward depthwise section 172* of the end wall 120* in the depthwise direction D that is configured to be received within the engagement channel 188* defined between the engagement members 184*, 186* of the rear endcap portion 180*. For instance, in one embodiment, the engagement tab 174* of the front endcap portion 170* may be configured to be snapped into the engagement channel 188*. Specifically, as shown in FIG. 10, the engagement members 184*, 186* of the rear endcap portion 180* may, in one embodiment, include hooked ends 190* that form a narrowed section of the engagement channel 188*. In such an embodiment, the hooked ends 190* of the engagement members 184*, 186* may be configured to flex outwardly as the engagement tab 174* is inserted therebetween and then snap back so as to engage around the engagement tab 174* once the tab 174* has been fully inserted into the engagement channel 188*, thereby retaining the tab 174* within the channel 188* (and, thus, maintain the endcap portions 170*, 180* coupled together).

However, it should be appreciated that, in other embodiments, the endcap portions 170*, 180* may include any other suitable engagement features or other coupling features that permit the endcap portions 170*, 180* to be selectively decoupled from and/or moved relative to one another when it is desired to open the bracket door 27 of the end bracket 23. For instance, in another embodiment, the front endcap portion 170* may be hingedly or pivotably coupled to the rear endcap portion 180* so that the front endcap portion 170* can be pivoted relative to the rear endcap portion 180*, thereby allowing front endcap portion 170* to be moved away from the bracket door 27. In such an embodiment, suitable engagement features, such as hinge or pivot connectors, may be provided to allow such a connection between the endcap portions 170*, 180*.

It should also be appreciated that, as described above, each valance mount 101* includes an end cap 102* and a separate end bracket 23. However, in other embodiments, the end cap 102* and end bracket 23 of each valance mount 101* may be formed integrally, such as by configuring each endcap 102* to include one or more of the bracket-related features and/or components described above. For instance, as an alternative to the alignment tabs 150*, each endcap 102* may include one or more bracket walls extending outwardly from the end wall 120* in the lateral direction L for supporting an adjacent lateral end of a headrail 22. Specifically, in one embodiment, each endcap 102* may include four bracket walls extending outwardly from the end wall 120* in the lateral direction L (e.g., top, bottom, front, and rear walls) to form a box-bracket-type configuration for receiving the lateral end of the headrail. In such an embodiment, the front bracket wall of the endcap 102* may, for instance, be formed by or incorporate a bracket door for inserting the lateral end of the headrail 22 into the "bracket" formed by the endcap, while the bottom bracket wall of the endcap 102* may function as a shelf for vertically supporting the adjacent lateral end of the headrail 22.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A valance assembly for at least partially concealing a headrail of a covering for an architectural structure, the valance assembly comprising:

a valance body extending in a lateral direction between a first lateral end and an opposed second lateral end;

first and second valance mounts configured to support first and second lateral ends, respectively, of a headrail of a covering, the first and second valance mounts being further configured to support the first and second lateral ends, respectively, of the valance body relative to the headrail, each of the first and second valance mounts comprising:

an endcap including an end wall and a front wall extending outwardly from the end wall, the endcap defining a valance retention channel relative to the front wall of the endcap that is configured to receive a respective one of the first and second lateral ends of the valance body; and a plurality of bracket walls receivable within the endcap, each bracket wall extending outwardly relative to the end wall of the endcap in the lateral direction, a first bracket wall of the plurality of bracket walls forming a shelf on which a respective one of the first and second lateral ends of the headrail is configured to rest to allow the respective valance mount to support the respective one of the first and second lateral ends of the headrail;

wherein:

one of the plurality of bracket walls is defined by a bracket door that is pivotable relative to the other of the plurality of bracket walls between an opened position, at which the respective one of the first and second lateral ends of the headrail can be inserted into the valance mount, and a closed position, at which the bracket door prevents the respective one of the first and second lateral ends of the headrail from being inserted into the valance mount.

2. The valance assembly of claim 1, wherein the endcap further comprises at least one retention element extending outwardly from the end wall at a location spaced apart from the front wall such that the valance retention channel is defined directly between the front wall and the at least one retention element.

3. The valance assembly of claim 2, wherein the at least one retention element comprises a plurality of retention elements extending outwardly from the end wall.

4. The valance assembly of claim 1, wherein the valance retention channel defines a profile or shape that substantially matches a corresponding profile or shape of the respective one of the first and second lateral ends of the valance body.

5. The valance assembly of claim 4, wherein the valance retention channel defines a curved profile or shape that substantially matches a corresponding curved profile or shape of the respective one of the first and second lateral ends of the valance body.

6. The valance assembly of claim 4, wherein the front wall defines a curved profile or shape that substantially matches the corresponding curved profile or shape of the respective one of the first and second lateral ends of the valance body.

7. The valance assembly of claim 1, wherein the valance body is configured the same as one or more of a plurality of slats of the covering relative to which the valance assembly is configured to be installed.

8. The valance assembly of claim 1, wherein each of the first and second valance mounts comprises an end bracket configured to be coupled to the endcap, the plurality of bracket walls forming a part of the end bracket and extending outwardly from a base wall of the end bracket in the lateral direction.

9. The valance assembly of claim 8, wherein the endcap further comprises at least one alignment tab for aligning the end bracket relative to the endcap.

10. The valance assembly of claim 1, wherein:

the end bracket is configured to be coupled to the endcap such that the bracket door is spaced apart from the end wall of the endcap by a lateral offset distance; and the lateral offset distance is greater than a lateral distance from which the front wall of the endcap extends from the end wall in the lateral direction such that the bracket door clears the front wall when being pivoted between the opened and closed positions.

11. The valance assembly of claim 10, wherein the endcap further comprises a spacer extending outwardly from the end wall of the endcap in the lateral direction, the base wall of the end bracket configured to be positioned against the spacer such that the bracket door is spaced apart from the inner surface of the end wall of the endcap by the lateral offset distance.

12. The valance assembly of claim 1, wherein:

the endcap comprises a rear endcap portion and a front endcap portion, with the rear endcap portion forming at least a portion of the end wall of the endcap and the front endcap position forming the front wall of the endcap;

the front endcap portion is configured to be selectively decoupled from or moved relative to the rear endcap portion; and the bracket door can be pivoted between the opened and closed positions when the front endcap portion is decoupled from or moved relative to the rear endcap portion.

13. The valance assembly of claim 12, wherein:

the end bracket is configured to be coupled to the endcap such that the bracket door is spaced apart from the end wall of the endcap by a lateral offset distance; and the lateral offset distance is less than a lateral distance from which the front wall of the endcap extends from the end wall in the lateral direction such that the front endcap portion must be decoupled from or moved relative to the rear endcap portion to allow the bracket door to be pivoted between the opened and closed positions.

14. The valance assembly of claim 1, wherein:

the endcap comprises a rear endcap portion and a front endcap portion, with the rear endcap portion forming at least a portion of the end wall of the endcap and the front endcap position forming the front wall of the endcap; and the front endcap portion is configured to be selectively decoupled from or moved relative to the rear endcap portion.

15. The valance assembly of claim 14, wherein the front and rear endcap portions include corresponding engagement features to allow the front endcap portion to be selectively decoupled from or moved relative to the rear endcap portion.

16. A valance assembly for at least partially concealing a headrail of a covering for an architectural structure, the valance assembly comprising:

a valance body extending in a lateral direction between a first lateral end and an opposed second lateral end;

first and second endcaps configured to support the first and second lateral ends, respectively, of the valance body, each of the first and second endcaps comprising an end wall and a front wall extending outwardly from the end wall; and first and second end brackets configured to be coupled to the first endcap and the second endcap, respectively, each end bracket including a plurality of bracket walls extending outwardly from a base wall of the end bracket in the lateral direction;

wherein:

a valance retention channel is defined relative to the front wall of each of the first and second endcaps that is configured to receive a respective one of the first and second lateral ends of the valance body; and the valance body is configured the same as one or more of a plurality of slats of the covering relative to which the valance assembly is configured to be installed.

17. The valance assembly of claim 16, wherein the valance body is configured to be interchangeable with the one or more of the plurality of slats.

18. The valance assembly of claim 16, wherein the valance retention channel defines a curved profile or shape that substantially matches a corresponding curved profile or shape of the respective one of the first and second lateral ends of the valance body.

19. A valance assembly for at least partially concealing a headrail of a covering for an architectural structure, the valance assembly comprising:

a valance body extending in a lateral direction between a first lateral end and an opposed second lateral end;

first and second valance mounts configured to support first and second lateral ends, respectively, of a headrail of a covering, the first and second valance mounts being further configured to support the first and second lateral ends, respectively, of the valance body relative to the headrail, each of the first and second valance mounts comprising:

an endcap including an end wall and a front wall extending outwardly from the end wall, the endcap defining a valance retention channel relative to the front wall of the endcap that is configured to receive a respective one of the first and second lateral ends of the valance body; and a plurality of bracket walls extending outwardly relative to the end wall of the endcap in the lateral direction, a first bracket wall of the plurality of bracket walls forming a shelf on which a respective one of the first and second lateral ends of the headrail is configured to rest to allow the respective valance mount to support the respective one of the first and second lateral ends of the headrail, wherein:

one bracket wall of the plurality of bracket walls is defined by a bracket door that is pivotable relative to the other of the plurality of bracket walls between an opened position, at which the respective one of the first and second lateral ends of the headrail can be inserted into a respective one of the first and second valance mounts, and a closed position, at which the bracket door prevents the respective one of the first and second lateral ends of the headrail from being inserted into the respective one of the first and second valance mounts;

the endcap comprises a spacer extending outwardly from the end wall of the endcap in the lateral direction, the spacer configured to offset the bracket door such that the bracket door is spaced apart from the inner surface of the end wall of the endcap by a lateral offset distance, the lateral offset distance greater than a lateral distance from which the front wall of the endcap extends from the end wall in the lateral direction such that the bracket door clears the front wall when being pivoted between the opened and closed positions.

20. The valance assembly of claim 1, wherein the valance retention channel is configured to receive the respective one of the first and second lateral ends of the valance body such that the valance body is positioned in front of the bracket door.

* * * * *